US012759147B2

(12) United States Patent
Ochiishi et al.

(10) Patent No.: US 12,759,147 B2
(45) Date of Patent: Oct. 13, 2026

(54) ROBOT SYSTEM AND ROBOT MOVEMENT CONTROL APPARATUS

(71) Applicant: FANUC CORPORATION, Yamanashi (JP)

(72) Inventors: Yoshinori Ochiishi, Yamanashi (JP); Hiroshi Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 18/266,188

(22) PCT Filed: Dec. 15, 2021

(86) PCT No.: PCT/JP2021/046228

§ 371 (c)(1),
(2) Date: Jun. 8, 2023

(87) PCT Pub. No.: WO2022/138367

PCT Pub. Date: Jun. 30, 2022

(65) Prior Publication Data

US 2024/0051133 A1 Feb. 15, 2024

(30) Foreign Application Priority Data

Dec. 22, 2020 (JP) ................................ 2020-211965

(51) Int. Cl.
*B25J 9/16* (2006.01)
*B25J 5/00* (2006.01)

(52) U.S. Cl.
CPC ............ *B25J 9/1664* (2013.01); *B25J 5/007* (2013.01); *B25J 9/162* (2013.01); *G05B 2219/40607* (2013.01)

(58) Field of Classification Search
CPC ................................ B25J 9/162; B25J 5/007
See application file for complete search history.

(56) References Cited

U.S. PATENT DOCUMENTS

| | | | |
|---|---|---|---|
| 2008/0123111 A1 | 5/2008 | Hori | |
| 2014/0142792 A1 | 5/2014 | Hanaka et al. | |
| 2018/0345492 A1* | 12/2018 | Watanabe ............... | B25J 9/044 |
| 2023/0381955 A1* | 11/2023 | Bacon .............. | G05B 19/41895 |

FOREIGN PATENT DOCUMENTS

| | | | | |
|---|---|---|---|---|
| CN | 111941398 A | | 11/2020 | |
| JP | H8-174449 A | | 7/1996 | |
| JP | 2000-288966 A | | 10/2000 | |
| JP | 2005329515 A | * | 12/2005 | |
| JP | 2008134144 A | * | 6/2008 | ............ G01B 21/12 |
| JP | 2010064198 A | * | 3/2010 | |

(Continued)

OTHER PUBLICATIONS

JP 2010064198 English translation (Year: 2010).*

(Continued)

*Primary Examiner* — Ramon A. Mercado
(74) *Attorney, Agent, or Firm* — HAUPTMAN HAM, LLP

(57) ABSTRACT

A robot system is provided with a robot including a free cart and a manipulator mounted on the free cart, and a control device for controlling the manipulator. The control device controls the manipulator to execute a predetermined task, and also controls the manipulator to move the robot itself.

9 Claims, 14 Drawing Sheets

(56) References Cited

FOREIGN PATENT DOCUMENTS

| | | | | | |
|---|---|---|---|---|---|
| JP | 2011108156 | A | * | 6/2011 | |
| JP | 2011189440 | A | * | 9/2011 | |
| JP | 2013025639 | A | * | 2/2013 | ............. B65G 54/02 |
| KR | 20120063810 | A | * | 6/2012 | |

OTHER PUBLICATIONS

KR-20120063810-A English translation (Year: 2012).*
International Search Report issued in PCT/JP2021/046228 mailed on Feb. 15, 2022 with English Translation (7 pages).
Written Opinion of International Searching Authority issued in PCT/JP2021/046228 mailed on Feb. 15, 2022 with English Translation (8 pages).

* cited by examiner

Robot 10 arranges workpiece (can) W on column plate CP1 at robot position PR1

Robot 10 moves to next robot position PR2, and arranges workpiece W on next column plate CP2

Robot hand 118 grasps side plate SPn+1 near next robot position PRn+1

Pull robot 10 to side plate SPn+1 with manipulator 11 to move robot 10

Robot 10 finishes moving

ROBOT SYSTEM AND ROBOT MOVEMENT CONTROL APPARATUS

TECHNICAL FIELD

This disclosure relates generally to a robot system and a robot movement control apparatus.

BACKGROUND

Recently, automation of work using collaborative robots has been advancing. Taking advantage of collaborative robots, it is conceivable that the robot is mounted on a hand-push free cart, the worker moves the robot while pushing the hand-push free cart, and the robot repeats work at each location.

However, since the worker needs to push the hand-push free cart each time the robot is moved, the worker cannot leave the robot, and the labor-saving effect is not as great as expected.

Under the circumstances, the introduction of a self-propelled free cart such as an automatic guided vehicle (AGV) is conceivable. An AGV can automate the movement as well as the work, which allows the worker to leave the robot and is expected to save labor.

However, the introduction of an AGV system is relatively large-scale because the AGV system itself is expensive, and the movement path of the AVG needs to be maintained in terms of space and equipment.

Therefore, the barriers to introducing collaborative robots that involve movement have never been low.

DETAILED DESCRIPTION

A robot system according to one aspect of the present disclosure is provided with a robot including a free cart and a manipulator mounted on the free cart, and a control device for controlling the manipulator. The control device controls the manipulator to execute a predetermined task, and also controls the manipulator to move the robot itself.

Hereinafter, a robot system according to the present embodiment will be described with reference to the drawings.

Figure 4A:
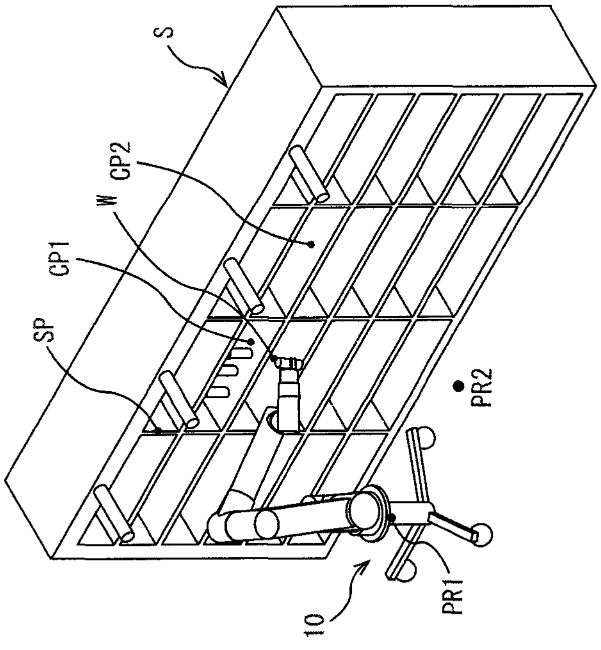
FIG. 4A is a supplementary explanatory diagram relating to step S3 in FIG. 3.
Figure 4B:
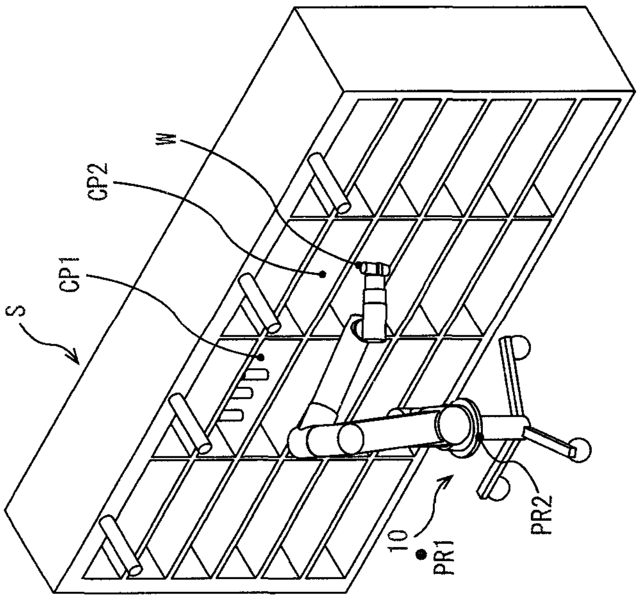
FIG. 4B is a supplementary explanatory diagram relating to step S5 in FIG. 3.

Here, for convenience of description, as shown in FIGS. 4A and 4B, as an example of the task executed by the robot system, the entire work of arranging, for example, beverage cans W as workpieces on each column plate CP when a shelf S is composed of a plurality of column plates CP partitioned by side plates SP is assumed. As an actual operation, a robot 10 picks up beverage cans W one by one from a stocker (not shown) storing a large number of beverage cans W as workpieces, releases each beverage can W onto one column plate CP1, and repeats the pickup and release works to arrange a predetermined number of beverage cans W such as ten in a row on the column plate CP1. Note that the work unit of arranging ten beverage cans W on one column plate CP will be referred to as a subtask. The robot 10 moves to the adjacent column plate CP2 and executes the same work (subtask). The task is completed by arranging beverage cans W on all the column plates CP while alternately repeating the subtask and the movement of the robot as described above.

Figure 1:
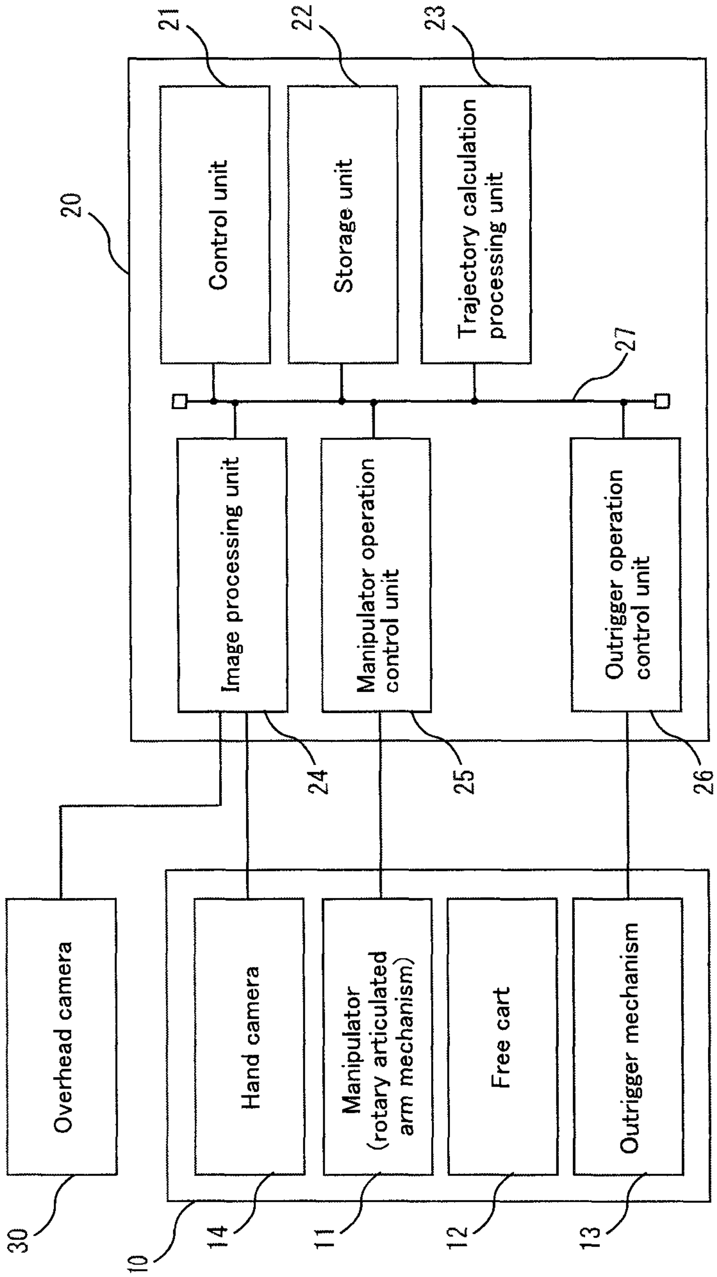
FIG. 1 is a diagram showing a configuration of a robot system according to an embodiment.

As shown in FIG. 1, the robot system according to the present embodiment includes the robot 10, a control device 20, and an overhead camera 30. The overhead camera 30 is installed at a position and posture to capture an overhead view of the entire work space including the shelf S, the robot 10, and the stocker (not shown). For the work space to be captured by the overhead camera 30, a world coordinate system (X, Y, Z) having an arbitrary position such as the center of a work area in the space as the origin is defined.

Figure 2:
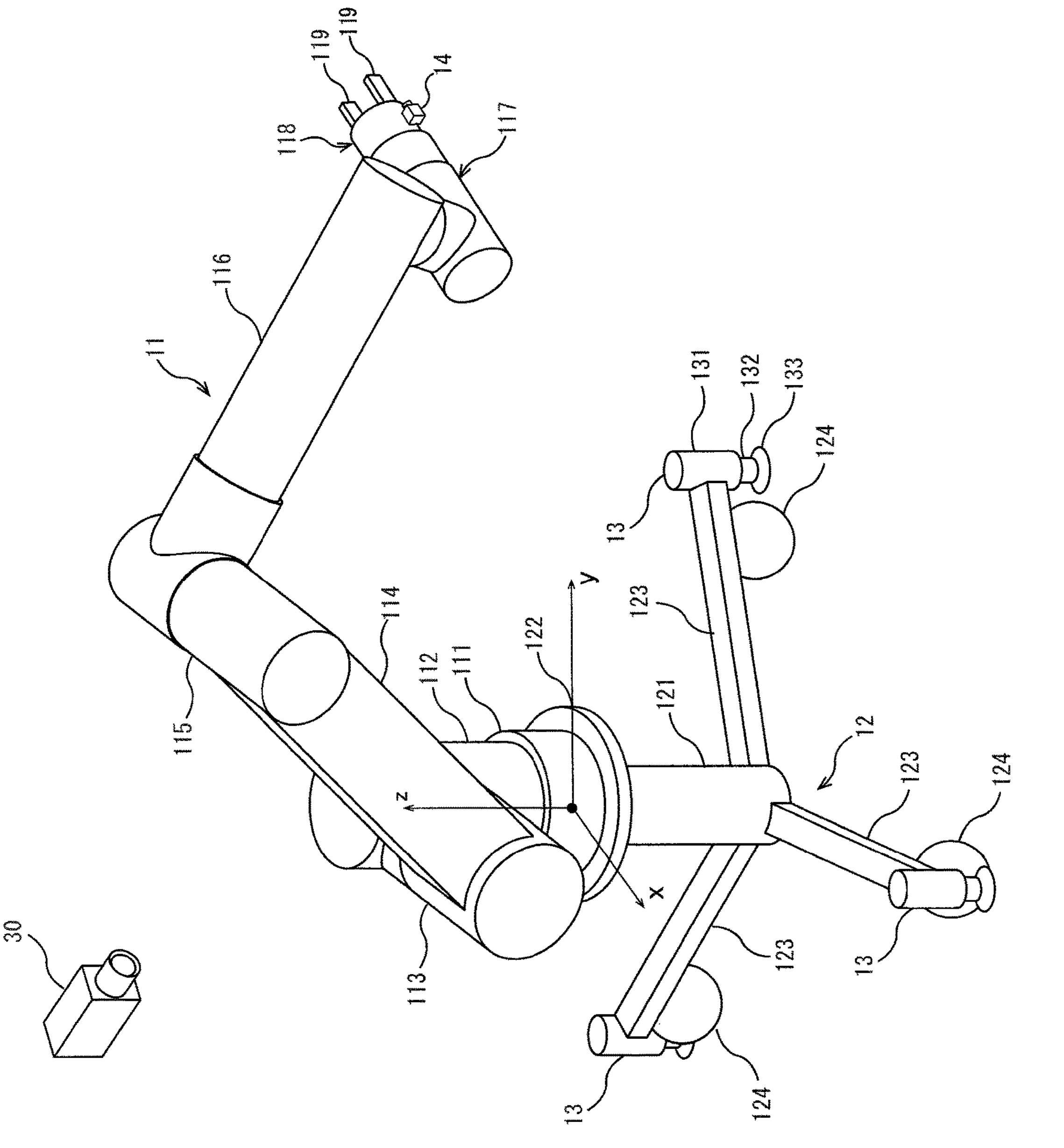
FIG. 2 is a perspective view of the robot shown in FIG. 1 and an overhead camera.

As shown in FIG. 2, the robot 10 has a manipulator 11 which is typically implemented as a rotary articulated arm mechanism. In the manipulator 11, links 114 and 116 are coupled via rotary joints 113 and 115 to a post 112 that is vertically rotatably supported on a base 111. A wrist 117 having three orthogonal axes of rotation is attached to the distal end of the link 116. A hand 118 that is herein equipped with a pair of fingers 119 as an end effector is attached to the wrist 117. A hand camera 14 is attached to the hand 118 to capture a hand image, as a sensor for detecting a hand target. A robot coordinate system (x, y, z) is defined, for example, with the center of the base 111 as the origin. The control device 20 calculates a hand trajectory or the like in the robot coordinate system (x, y, z) and controls the manipulator 11 to achieve hand movement.

The manipulator 11 is mounted on a table 122 of a free cart 12. The free cart 12 is defined as a free cart that is not equipped with movement drive means, but is equipped with casters 124 and moves passively. Here, three casters 124 are attached to respective three beams 123 extending radially from the post 121. An outrigger mechanism 13 is provided at the distal end of each of the three beams 123. In the outrigger mechanism 13, a cylinder rod 132 is inserted into a cylinder 131, and a pad 133 as an installation plate made of rubber or the like is attached to the bottom of the cylinder rod 132. Movement of the cylinder rod 132 relative to the cylinder 131 can be achieved by a hydraulic system, an electric system, or any other drive system. By sending the cylinder rod 132 out of the cylinder 131, the pad 133 is placed on the floor surface, and the free cart 12 can be fixed together with the robot 10. By pulling the cylinder rod 132 back into the cylinder 131, the pad 133 is separated from the floor surface, and the free cart 12 is unfixed to be movable.

Referring back to FIG. 1, the control device 20 stores in advance, in a control unit (e.g., processor) 21 that supervises overall control, data of a plurality of positions PR respectively corresponding to a plurality of subtasks repeatedly executed by the robot 10, together with task program codes describing procedures, operations, conditions, and the like necessary for executing the aforementioned task via a control/data bus 27. The positions PR of the robot 10 are expressed in the world coordinate system (X, Y, Z).

Figure 9:
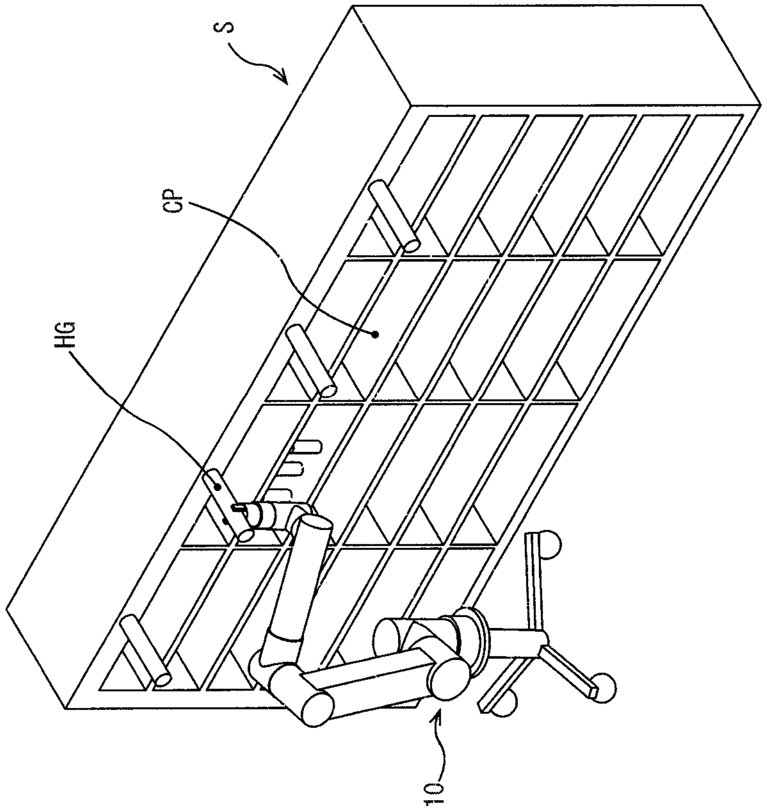
FIG. 9 is a perspective view showing a handle already existing as a grasping portion to be grasped by the manipulator.

An image processing unit (e.g., processor) 24 processes the overhead image captured by the overhead camera 30, and extracts the areas of the column plates CP and the areas of the side plates SP. The image processing unit 24 selects, from the extracted areas of the side plates SP, an area of the side plate SP near a position (movement target position) PR to which the robot 10 moves for the next subtask as an area of a fixed object to be grasped by the hand 118 on the movement path of the robot 10. The image processing unit 24 calculates a center position, a center of gravity position, or another position of the selected area of the side plate SP as a grasping position to be grasped by the hand 118 in order for the robot 10 to move to the movement target position. The grasping position is calculated and expressed in the world coordinate system (X, Y, Z). The object to be grasped by the hand 118 is not limited to the side plate SP, and may be a column plate CP or a protruding body that is relatively easy to grasp, such as a handle HG already existing on the shelf S for grasping as shown in FIG. 9.

A trajectory calculation processing unit (e.g., processor) 23 calculates a coordinate transformation matrix (first coordinate transformation matrix, T1) for transforming the position and posture in the world coordinate system to the position and posture in the first robot coordinate system, based on the displacement of the origin position of the current robot coordinate system (x, y, z) (referred to as the first robot coordinate system) with respect to the origin position of the world coordinate system (X, Y, Z) and the rotational angles (also referred to as the posture) around the coordinate axes XYZ for aligning the coordinate system xyz with the coordinate axes XYZ.

The trajectory calculation processing unit 23 uses the first coordinate transformation matrix (T1) to transform the next grasping position on the movement path of the robot 10, that is, the hand position, to the hand position in the first robot coordinate system. The trajectory calculation processing unit 23 calculates a hand movement trajectory (particularly referred to as a “hand movement trajectory for grasping”) in the first robot coordinate system from the known current hand position in the first robot coordinate system to the next hand position.

The next hand position is a fixed position because it is a position on a side plate SP of the shelf S fixed to the floor surface, and by operating the manipulator 11 with the side plate SP grasped by the hand 118 at the next hand position, the manipulator 11, namely the robot 10, can be moved together with the free cart 12 to the next robot position (movement target position) PR. The trajectory calculation processing unit 23 calculates a hand trajectory for the movement of the robot 10.

The trajectory calculation processing unit 23 calculates a coordinate transformation matrix (second coordinate transformation matrix, T2) from the first robot coordinate system to the second robot coordinate system, based on the displacement of the next robot position after the movement, that is, the origin position of the robot coordinate system after the movement (second robot coordinate system) with respect to the current robot position in the world coordinate system (X, Y, Z), that is, the origin position of the current robot coordinate system (first robot coordinate system), and the rotational angles (posture) around the coordinate axes xyz of the first robot coordinate system for aligning the coordinate axes xyz of the first robot coordinate system with the coordinate axes xyz of the second robot coordinate system.

The trajectory calculation processing unit 23 calculates a hand movement trajectory (referred to as a “hand movement trajectory for robot movement”) from the next hand position expressed in the first robot coordinate system (which is the current position at the time of grasping, but will be referred to as the next position for convenience of description) to a position obtained by multiplying the next hand position by an inverse matrix T2' of the second coordinate transformation matrix T2.

Figure 8:
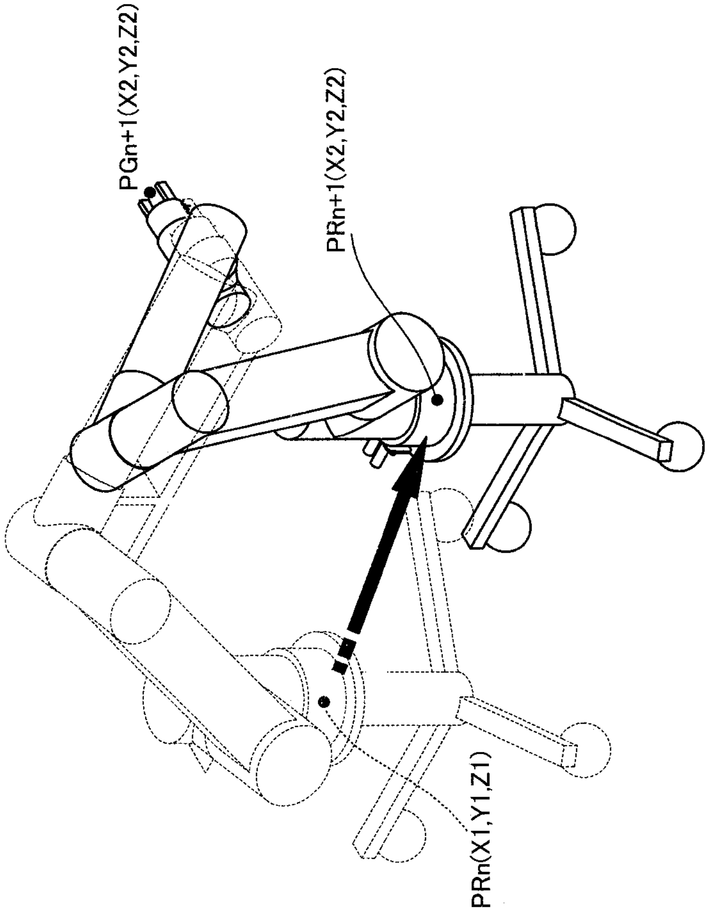
FIG. 8 is a perspective view showing how the robot is moved by a manipulator operation according to the present embodiment.

By controlling the manipulator 11 in accordance with this “hand movement trajectory for robot movement”, the robot 10, namely, the manipulator 11 can be moved together with the free cart 12, with the hand fixed at the next grasping position (see FIG. 8).

The “hand movement trajectory for robot movement” corresponds to a trajectory obtained by shifting the movement path for the robot 10 to move from the current position to the next position (movement target position) to the next hand position as it is and reversing the movement direction. Therefore, an operation to move the hand in accordance with the “hand movement trajectory for robot movement” with the hand grasping and fixed at the next hand position can move the robot 10 from the current position to the next position (movement target position).

A manipulator operation control unit (e.g., processor) 25 calculates changes in the rotational angles and rotational speeds relating to the rotary joints 113 and 115 and the wrist’s three orthogonal axes in accordance with the “hand movement trajectory for grasping”, and drives the servo motors of the rotary joint 113, the rotary joint 115, and the wrist in accordance with the calculated changes. Similarly, the manipulator operation control unit 25 calculates changes in the rotational angles and rotational speeds of the rotary joints 113 and 115 and the wrist’s three orthogonal axes in accordance with the “hand movement trajectory for robot movement”, and drives the servo motors of the rotary joint 113, the rotary joint 115, and the wrist in accordance with the calculated changes.

By operating the manipulator 11 so as to move the hand along the trajectory in the reverse direction with respect to the movement path for the robot 10 to move from the current position to the next position (movement target position), the robot 10 is moved from the current position to the next position (movement target position) because the hand is fixed and the free cart 12 is unfixed and is free to move.

An outrigger operation control unit (e.g., processor) 26 drives a drive unit of the outrigger mechanism 13 in accordance with an instruction from the control unit 21 to send out or pull back the cylinder rod 132 from or into the cylinder 131. The free cart 12 can be fixed by sending out the cylinder rod 132 from the cylinder 131 and placing the pad 133 on the floor surface. By pulling the cylinder rod 132 back into the cylinder 131 and separating the pad 133 from the floor surface, the casters 124 of the free cart 12 can be placed on the floor surface and the free cart 12 returns to a movable state. The outrigger mechanism 13 can be replaced with another structure such as an electromagnetic brake as long as the free cart 12 can be fixed on the floor surface.

Figure 3:
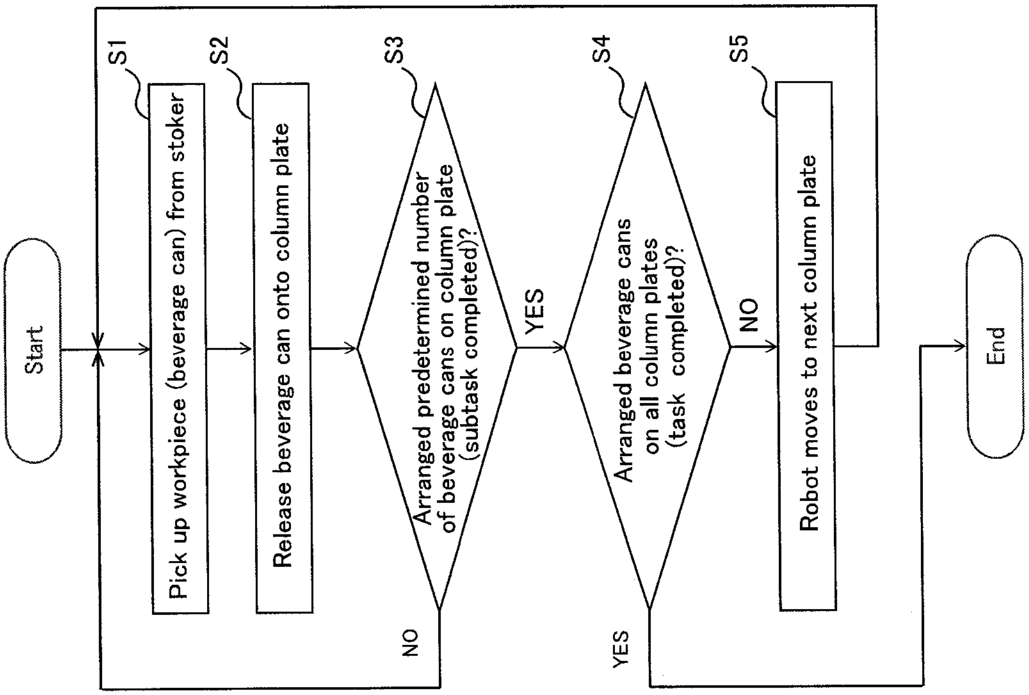
FIG. 3 is a flowchart showing a processing procedure of a robot system according to the present embodiment.

FIG. 3 shows a processing procedure of the robot system according to the present embodiment. FIGS. 4A and 4B show an overview of the work. The free cart 12 is fixed at the first robot position PR1 on the floor surface. The control unit 21 reads a subtask program code from a storage unit 22, and the trajectory calculation processing unit 23 calculates a hand movement trajectory for picking up a beverage can W from the stocker and releasing it onto the first column plate CP1 in accordance with the subtask program code. The manipulator operation control unit (e.g., processor) 25 controls the manipulator 11 in accordance with the hand movement trajectory, so that the manipulator 11 and the hand 118 pick up the beverage can W from the stocker (step S1) and release it onto the first column plate CP1 (S2). The control unit 21 determines whether or not the subtask of arranging a predetermined number of beverage cans W on the column plate CP1 has been completed (S3). When it is determined that the subtask has not been completed (NO in S3), the processing returns to step S1. Steps S1, S2, and S3 are repeated until the subtask of arranging a predetermined number of beverage cans W on the column plate CP1 is completed.

When it is determined that the subtask has been completed (YES in S3), the control unit 21 determines whether or not the work of arranging beverage cans W on all of the scheduled column plates CP, that is, the task has been completed (S4). When it is determined that the task has not been completed (NO in S4), the robot 10 is moved to the next robot position PR2 (movement target position) corresponding to the next column plate CP2 (S5). When the robot 10 reaches the movement target position, the outrigger mechanism 13 is driven at that position, and the free cart 12 is fixed at the next robot position PR2 on the floor surface. The processing returns to step S1, and a subtask of arranging beverage cans W on the next column plate CP2 is executed. When it is determined that the task has been completed (YES in S4), the work ends.

Figure 5A:
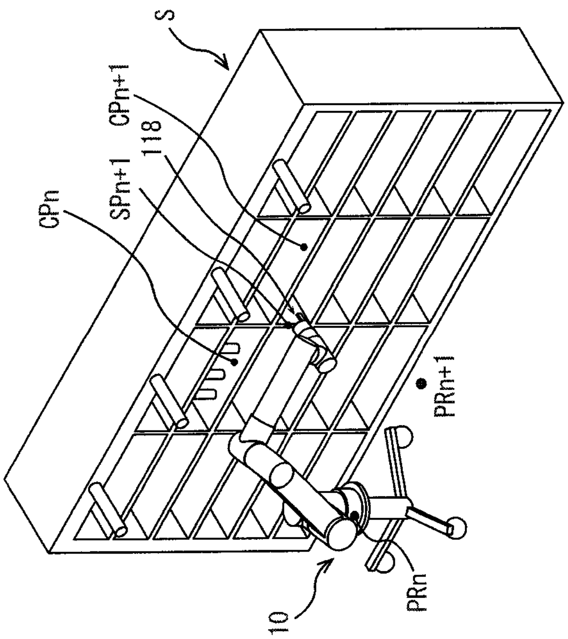
FIG. 5A is a supplementary explanatory diagram relating to the first process in step S5 in FIG. 3.
Figure 5B:
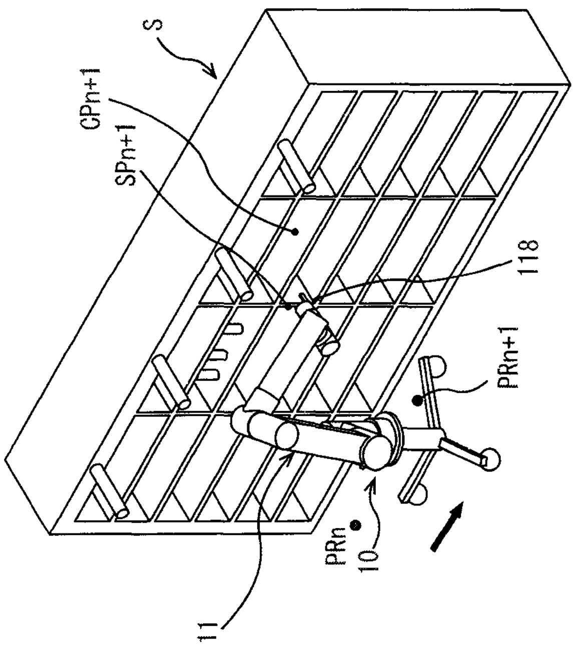
FIG. 5B is a supplementary explanatory diagram relating to the next process to FIG. 5A.
Figure 5C:
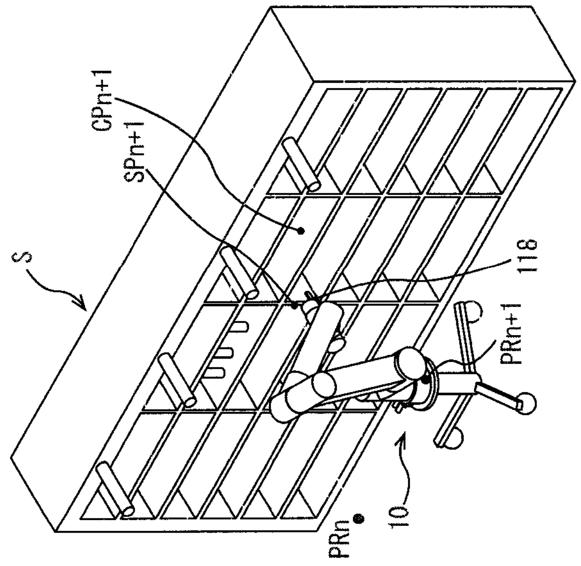
FIG. 5C is a supplementary explanatory diagram relating to the next process to FIG. 5B.

FIGS. 5A, 5B, and 5C show an overview of the robot movement. The manipulator 11, which is originally equipped for executing the task of arranging beverage cans W or the like, is also utilized for moving the robot 10. As shown in FIG. 5A, with the robot 10 located at the current robot position PRn, the manipulator 11 is operated so that the hand 118 grasps, for example, the side plate SPn+1 as a fixed portion near the next robot position PRn+1 while the position is being detected by the hand camera 14. As shown in FIG. 5B, the robot 10 is moved little by little by operating the manipulator 11 with the side plate SPn+1 grasped by the hand 118. As shown in FIG. 5C, the robot 10 is moved to the next robot position PRn+1 which is the movement target position by further operating the manipulator 11.

Figure 6:
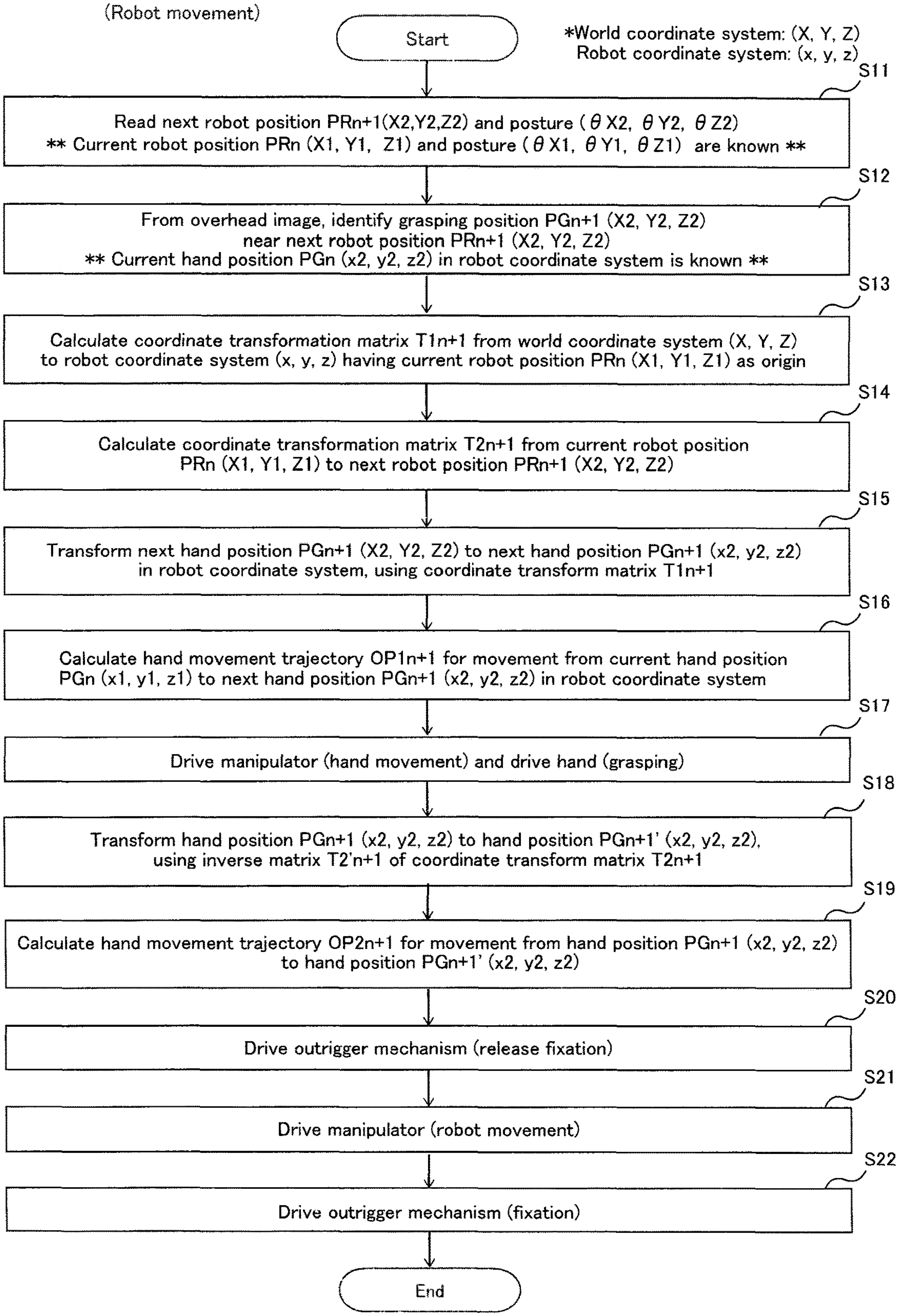
FIG. 6 is a schematic diagram of robot movement according to the present embodiment.
Figure 7:
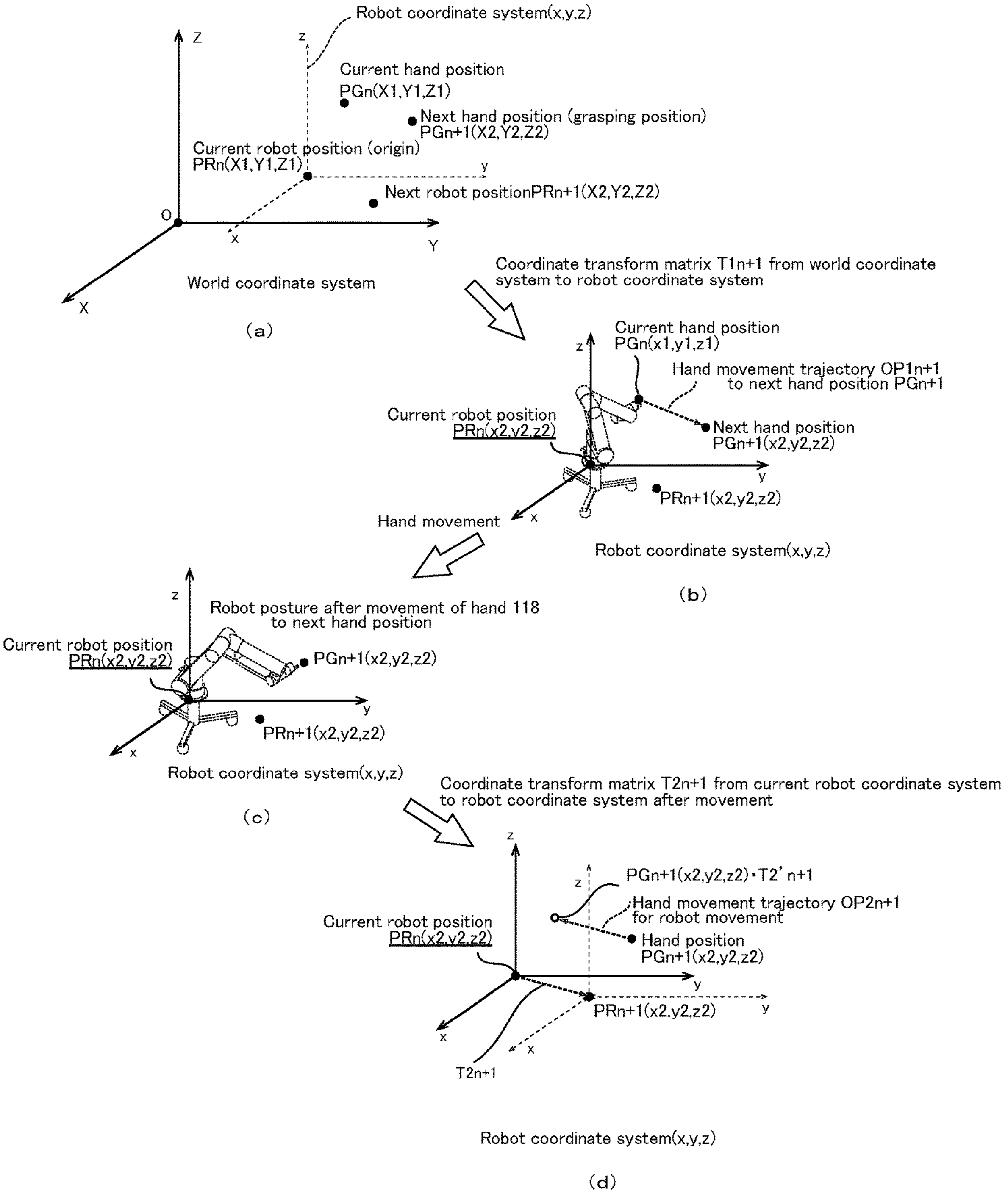
FIG. 7 is a supplementary diagram for the coordinate transformation in FIG. 3.

FIG. 6 shows a processing procedure of the control device 20 for achieving the movement of the robot 10 shown in FIGS. 5A, 5B, and 5C. FIG. 7 is a supplementary diagram of the coordinate transformation processing. In step S11, under the control of the control unit 21, data of the next robot position PRn+1 (X2, Y2, Z2) expressed in the world coordinate system (X, Y, Z) and data of the posture of the robot coordinate system (second robot coordinate system) at the next robot position PRn+1 (X2, Y2, Z2) are read from the storage unit 22 to the trajectory calculation processing unit 23 (S11). The posture is defined by the rotational angles (θX2, θY2, θZ2) around the coordinate axes XYZ of the robot coordinate system with respect to the world coordinate system. The current robot position PRn (X1, Y1, Z1) and the current hand position PGn (X1, Y1, Z1) are known.

In step S12, the image processing unit 24 extracts an area of a side plate SP2 near the next column plate CP2 from an overhead image captured by the overhead camera 30, and identifies the center position or the like of the extracted area of the side plate SP2 as a grasping position PGn+1 (X2, Y2, Z2) to be grasped by the hand 118 in order for the robot 10 to move to the next robot position (movement target position) PRn+1.

In step S13, the trajectory calculation processing unit 23 calculates a coordinate transformation matrix (first coordinate transformation matrix, T1) for transforming the position and posture in the world coordinate system to the position and posture in the first robot coordinate system, based on the origin position of the current robot coordinate system (first robot coordinate system) in the world coordinate system (X, Y, Z) and the rotational angles (posture) around the coordinate axes XYZ for aligning the coordinate system xyz with the coordinate axes XYZ (see FIG. 7(*a*)).

Similarly, in step S14, the trajectory calculation processing unit 23 calculates a coordinate transformation matrix (second coordinate transformation matrix, T2) from the first robot coordinate system to the second robot coordinate system, based on the displacement of the next robot position PRn+1 (X2, Y2, Z2) with respect to the current robot position PRn (X1, Y1, Z1) in the world coordinate system (X, Y, Z) and the rotational angles (posture) around the coordinate axes XYZ of the robot coordinate system (second robot coordinate system) at the next robot position PRn+1 (X2, Y2, Z2) with respect to the robot coordinate system (first robot coordinate system) at the current robot position PRn (X1, Y1, Z1) (see FIG. 7(*d*)).

In robot control, in order to calculate a rotary joint angle and the like in accordance with a hand movement trajectory, the hand movement trajectory needs to be expressed in the robot coordinate system. Therefore, in step S15, the next hand position PGn+1 (X2, Y2, Z2) expressed in the world coordinate system is transformed to the next hand position PRn+1 (x2, y2, z2) in the robot coordinate system by the first coordinate transformation matrix T1.

In the next step S16, the trajectory calculation processing unit 23 calculates a hand movement trajectory (hand movement trajectory for grasping) OPn+1 for the hand to move from the current hand position PGn (x1, y1, z1) to the next hand position PGn+1 (x2, y2, z2) in the first robot coordinate system (see FIG. 7(*b*)).

In step S17, the manipulator operation control unit 25 operates the manipulator 11 in accordance with the hand movement trajectory OPn+1 for grasping, and a side plate SP is grasped by the hand 118 at the next hand position PGn+1. The posture of the robot at this time is shown in FIG. 7(*c*).

In the next step S18, the trajectory calculation processing unit 23 multiplies the next hand position PGn+1 (x2, y2, z2) expressed in the first robot coordinate system by the inverse matrix T2' of the second coordinate transformation matrix T2 to calculate a hand position PG'n+1 (x2, y2, z2). The relative positional relationship between the hand position PG'n+1 (x2, y2, z2) and the current robot position PRn (x1, y1, z1) before the movement is equivalent to the relative positional relationship between the next hand position PGn+1 (x2, y2, z2) and the next robot position PRn+1 (x2, y2, z2) after the movement (see FIG. 7(*d*)).

In the next step S19, the trajectory calculation processing unit 23 calculates a hand movement trajectory OP2*n*+1 (hand movement trajectory for robot movement) for the hand to move from the hand position PGn+1 (x2, y2, z2) expressed in the first robot coordinate system to the hand position PG'n+1 (x2, y2, z2) transformed by the inverse matrix T2' of the second coordinate transformation matrix T2.

The hand movement trajectory OP2*n*+1 for robot movement is a trajectory obtained by reversing the start point and the end point of the movement path for the robot 10 to move from the current position PRn (x1, y1, z1) to the next robot position PRn+1 (x2, y2, z2) and shifting the movement path so that the start point coincides with the hand position PGn+1 (x2, y2, z2). Therefore, as the manipulator 11 is operated to move the hand in accordance with the hand movement trajectory OP2*n*+1 for robot movement with the hand 118 grasping and fixed at the PRn+1 (x2, y2, z2), the robot 10 approaches (or moves away from) the next hand position PGn+1 (x2, y2, z2); as a result, the robot 10 is moved from the current position PRn (x1, y1, z1) to the next robot position PRn+1 (x2, y2, z2).

In step S20, the outrigger mechanism 13 is driven to release the fixation, and in step S21, the manipulator 11 is controlled in accordance with the "hand movement trajectory for robot movement", so that the robot 10, that is, the manipulator 11 is moved to the movement target position PRn+1 (2, Y2, Z2) together with the free cart 12, with the grasping position PGn+1 (2, Y2, Z2) fixed (see FIG. 8). After completion of the movement, in step S22, the outrigger mechanism 13 is driven, and the free cart 12 is fixed at the position PRn+1 (X2, Y2, Z2).

As described above, in the present embodiment, the manipulator 11, which is originally equipped for executing the task, is also utilized for moving the robot 10, thereby eliminating the need for a worker to push the free cart, which saves labor. Since the introduction of a self-propelled free cart such as an automatic guided vehicle (AGV) becomes unnecessary, and the maintenance of the movement path becomes substantially unnecessary, collaborative robots that involve movement can be easily introduced.

Figure 10:
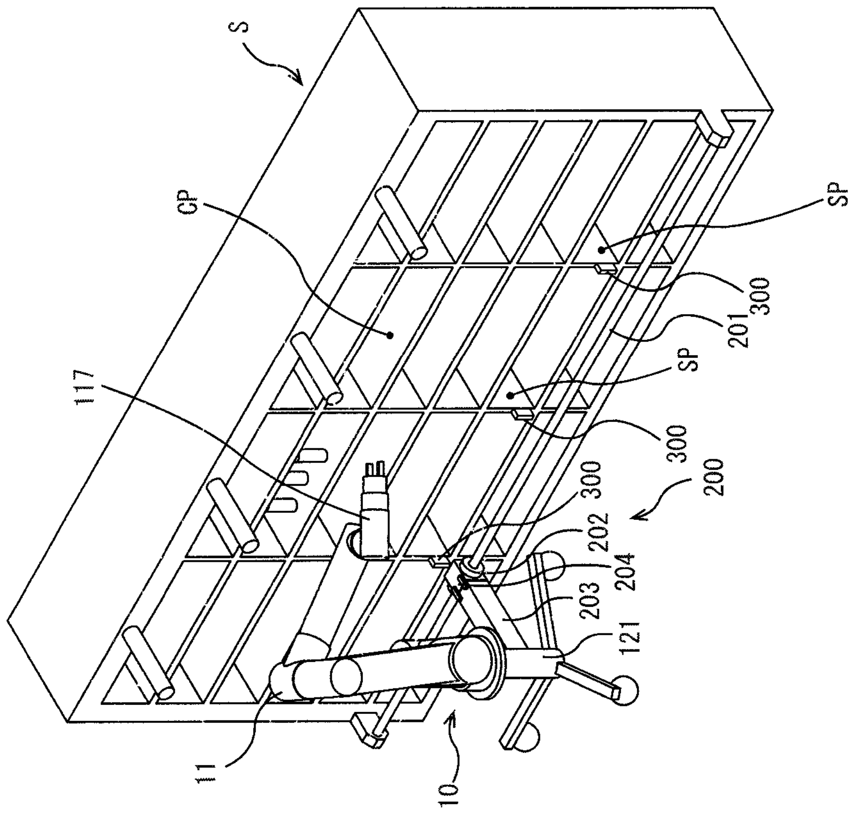
FIG. 10 is a perspective view showing a guide mechanism for guiding the movement of the robot.

As shown in FIG. 10, a guide mechanism 200 installed along the movement path for guiding the movement of the robot 10 may be provided for the purpose of simplifying the processes of moving the robot 10 and changing the posture of the robot 10 and improving the smoothness and accuracy of the movement and posture change of the robot 10. The guide mechanism 200 includes a guide pole 201 laid along the movement trajectory of the robot 10, and a slider 202 movably inserted into the guide pole 201. A connection block 204 is detachably attached to the slider 202, and the connection block 204 is to be fixed to the distal end of a cross bar 203 that is horizontally attached to the post 121 of the free cart 12. When the robot 10 is not needed, it can be removed from the slider 202 and easily moved to another place.

Alternatively, a plurality of sensors 300 such as photoelectric sensors or push switches for detecting the robot 10 may be laid along the movement trajectory of the robot 10, and here, a plurality of sensors 300 may be provided on the respective side plates SP along the guide pole 201 so that the position of the robot 10 may be detected by these sensors 300.

Figure 11:
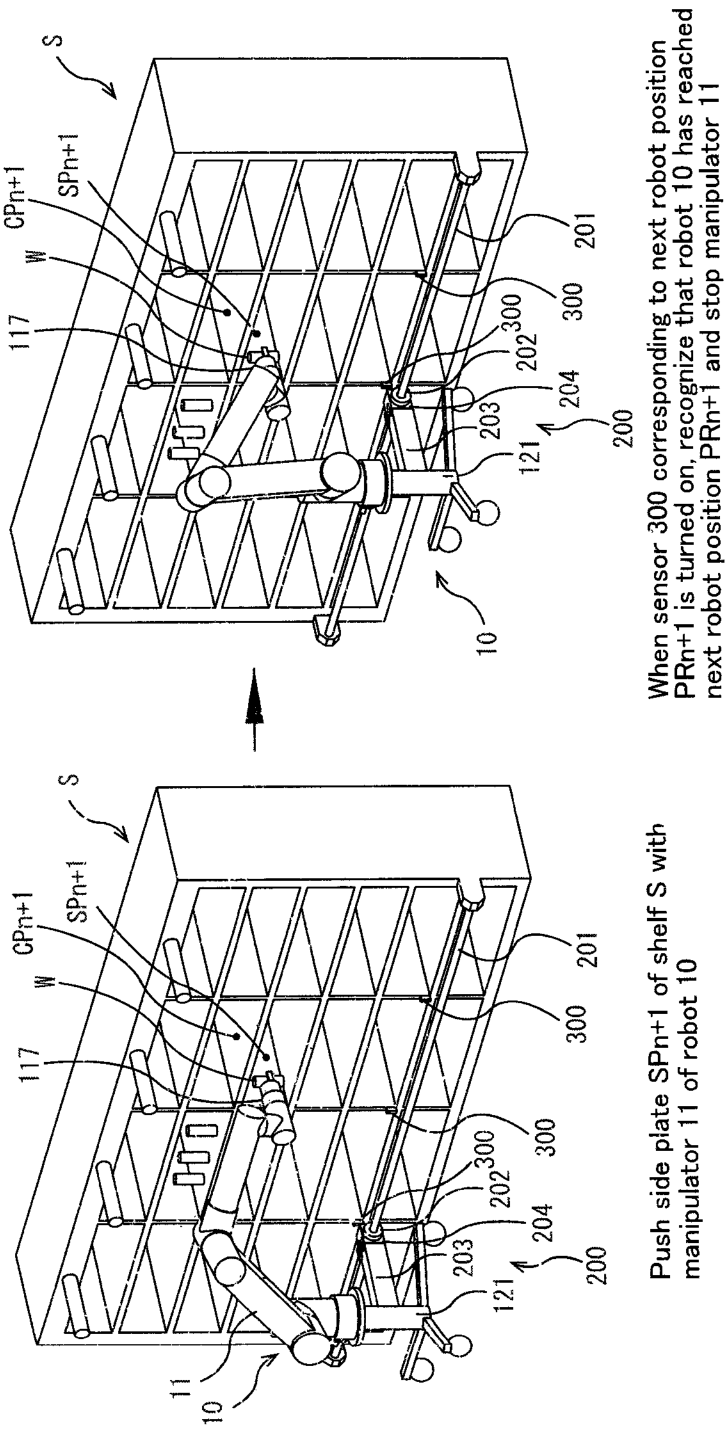
FIG. 11 is a diagram showing an example of robot movement utilizing the guide mechanism shown in FIG. 10.

As shown in FIG. 11, the robot 10 can be moved without using the hand 118 to grasp a fixed object (side plate SP) by operating the manipulator 11 with a part of the manipulator 11, typically the wrist 117, hooked on or pressed against a fixed object on the movement path, such as the side plate SPn+1. The robot 10 can be moved to the next robot position PRn+1 by stopping the manipulator 11 when the sensor 300 that approximates the next robot position PRn+1 is turned on.

Even in this example, as in the above-described embodiment, labor can be saved and maintenance of the movement path become substantially unnecessary, so that collaborative robots that involve movement can be easily introduced.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot system, comprising:

a robot including a free cart and a manipulator mounted on the free cart; and a control device for controlling the manipulator, wherein the control device controls the manipulator to execute a predetermined task, calculates a movement trajectory of an end of a hand equipped at the manipulator based on a displacement from a current position to a next position of the robot and, based on the movement trajectory of the end of the hand, controls the manipulator to move the robot itself to the next position, the hand is attached to a distal end of the manipulator, the control device operates the manipulator with the hand grasping a fixed object on a movement path of the robot to move the robot toward or away from the fixed object, and the control device based on a posture change and a displacement of a movement target position with respect to the current position of the robot, calculates a coordinate transformation matrix from a first robot coordinate system having the current position of the robot as an origin to a second robot coordinate system having the movement target position as an origin, calculates a hand movement trajectory from a hand position of the hand grasping the fixed object to a position obtained by multiplying the hand position of the hand grasping the fixed object by an inverse matrix of the coordinate transformation matrix, and controls the manipulator in accordance with the hand movement trajectory to move the robot from the current position to the movement target position.

2. The robot system according to claim 1, wherein a protruding body having a predetermined shape is installed as the fixed object along the movement path of the robot.

3. The robot system according to claim 1, further comprising:

an overhead camera for detecting a position of the robot.

4. The robot system according to claim 1, wherein a sensor for detecting a position of the robot is installed along the movement path of the robot.

5. The robot system according to claim 1, wherein the robot is equipped with a sensor for detecting a position.

6. The robot system according to claim 1, further comprising:

a guide mechanism installed for guiding a movement of the robot.

7. The robot system according to claim 6, wherein the guide mechanism includes a guide pole laid along a movement trajectory of the robot and a slider inserted into the guide pole, and the robot or the free cart is detachably attached to the slider.

8. The robot system according to claim 1, wherein the robot is moved toward or away from the fixed object on the movement path of the robot by operating the manipulator with a part of the manipulator pressed against the fixed object.

9. A robot movement control apparatus for controlling movement of a robot including a free cart, a manipulator mounted on the free cart, and a hand equipped at a distal end of the manipulator, the robot movement control apparatus comprising:

a unit for calculating a first coordinate transformation matrix (T1) for transforming a position and a posture in a world coordinate system to a position and a posture in a first robot coordinate system having a current position of the robot as an origin, based on a position and rotational angles around axes of the first robot coordinate system with respect to the world coordinate system;

a unit for transforming, by the first coordinate transformation matrix (T1), a grasping position at which the hand grasps a fixed object on a movement path of the robot to a grasping position expressed in the first robot coordinate system;

a unit for calculating a second coordinate transformation matrix (T2) from the first robot coordinate system to a second robot coordinate system having a movement target position as an origin, based on a posture change and a displacement of the movement target position with respect to the current position of the robot;

a unit for calculating a hand movement trajectory from the grasping position expressed in the first robot coordinate system to a position obtained by multiplying the grasping position expressed in the first robot coordinate system by an inverse matrix of the second coordinate transformation matrix (T2); and a control unit for controlling the manipulator in accordance with the hand movement trajectory to move the robot from the current position to the movement target position, wherein the control unit controls the manipulator to execute a predetermined task, calculates a movement trajectory of an end of the hand based on a displacement from a current position to a next position of the robot and, based on the movement trajectory of the end of the hand, controls the manipulator to move the robot itself to the next position.

* * * * *